United States Patent Office 3,412,451
Patented Nov. 26, 1968

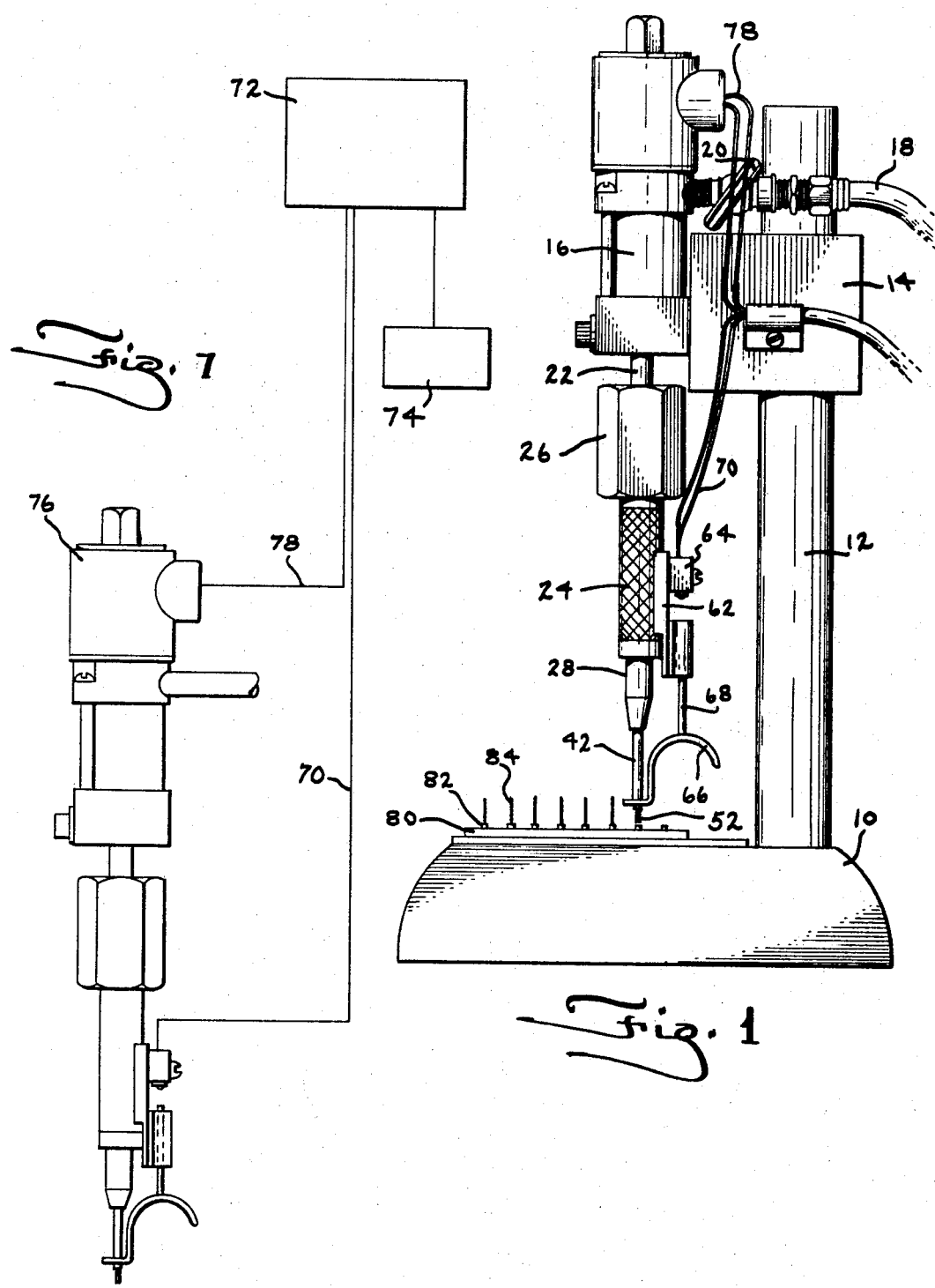

3,412,451
FORCE LIMITING TOOL
Carl Frederick Vieser and Frank Irvin Douglass, Mechanicsburg, Pa., assignors to AMP Incorporated, Harrisburg, Pa.
Filed Feb. 10, 1966, Ser. No. 526,574
5 Claims. (Cl. 29—203)

ABSTRACT OF THE DISCLOSURE

A staking tool is provided which is capable of delivering uniform maximum pressure during assembly of interfitting articles. Force imposing springs provide both for the uniform pressure output and for reduced shock in applying to the tool to the workpiece. Sensing means are connected to the power means for disabling the power means upon reaching the desired predetermined pressure.

---

This invention relates to the art of machine tools and more particularly to a new and improved tool which will exert a predetermined force on a work piece.

The tool of the present invention is capable of a wide variety of uses although for purposes of illustration the principles of the invention have been shown in a staking tool constituting a preferred embodiment.

Force exerting tools are presently used for a wide variety of purposes, one of which is in staking operations to effect an electrical termination. In such operations an eyelet is provided through which extends the end of a wire to be terminated. A post or stake is then inserted into the eyelet to sandwich the wire between the post and the eyelet. It is important that the post be driven into the eyelet the proper amount. If the post is not driven deep enough there will not be an effective electrical termination whereas if the post is driven too deep the wire will be pinched off thus destroying the termination. It is therefore desirable to provide a tool which will insert a post within an eyelet with a predetermined amount of force. This insertion may be accomplished by driving the post into the eyelet or conversely driving the eyelet around the post. The difficulty in designing a tool to accomplish this purpose stems from the fact that the posts are often of varying lengths and the eyelets are of varying diameters, whereby different posts will have to be inserted varying distances into different eyelets in order to attain the desired force. Also various wire ranges and insulation thickness would require varying post heights.

It is therefore a principal object of the present invention to provide a tool which will exert a predetermined amount of force.

Another object is to provide a tool which will exert the same amount of force regardless of the amount of tool travel.

A further object of the present invention is to provide a tool which will exert a set amount of force without producing any objectionable shock to the work piece.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

In the drawings, in which like reference numerals refer to like parts:

FIGURE 1 is a side elevational view of a tool made in accordance with the teachings of the present invention;

FIGURE 7 is a schematic view of the tool of FIGURE 1 and the control system therefor.

Figure 6:
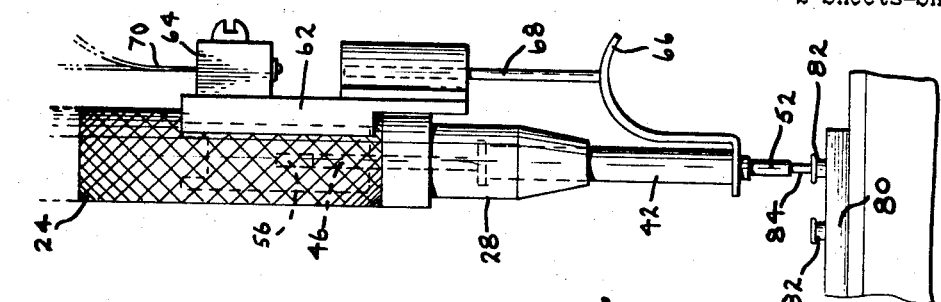
FIGURES 2 through 6 are elevational views partly in section of the tool of FIGURE 1 showing the tool in its various positions during a cycle of operation.

With reference to FIGURE 1 there is shown a staking tool comprising a base 10 having a tool supporting column 12 rigidly fixed thereto and extending therefrom. A suitable mounting bracket 14 is adjustably secured to the column 12. Carried by the bracket 14 is the tool drive means which in this instance comprises an air cylinder 16. The cylinder 16 is secured to bracket 14 by screws or the like in a conventional manner. The air cylinder 16 is connected to an air source (not shown) by means of an air hose 18 and a flow control valve 20. By adjusting the valve 20 the speed of movement of the piston rod 22 of the cylinder 16 can be controlled.

Figure 5:
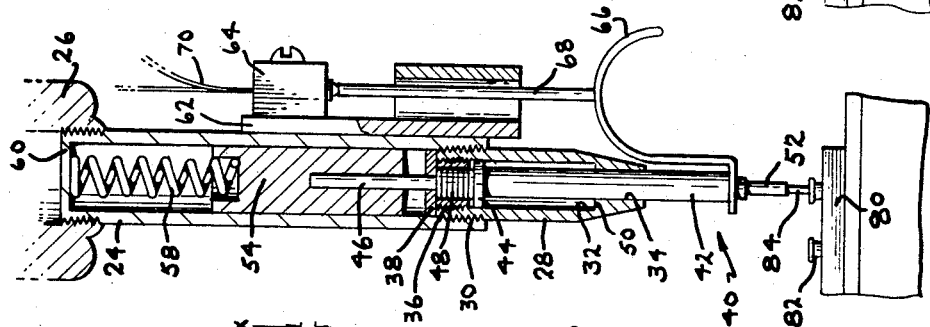

A hollow tool body 24 is threaded at its upper end, see FIGURE 5, for connection to an adapter 26, which adapter is secured to the end of the piston rod 22. Therefore actuation of air cylinder 16 will cause the reciprocation of the tool body 24.

Tool body 24 carries an extension member 28 at its lower end, the member 28 being threadably secured to the tool body at 30. A pair of bores 32 and 34 are formed in the member 28 with the bore 32 being threaded at 36 for receiving a cap nut 38. Disposed within the member 28 is the tool head indicated generally at 40. The tool head comprises a generally cylindrical section 42 slidable within the bore 34 and an enlarged end portion 44 slidable within the bore 32. A rod like coupling member 46 extends from the end 44 and is slidably received in a suitable aperture formed in the nut 38. A spring 48 encircles the member 46 and acts between the nut 38 and the enlarged end 44 of the tool head to thus bias the head downwardly as seen in the drawings. The downward movement of the tool head 40 is limited by engagement of the enlarged end 44 with a shoulder 50 formed in member 28 at the intersection of the bores 32 and 34.

A staking head 52 is secured at the end of cylindrical portion 42, the staking head constituting the work piece engaging portion of the tool. A piston-like member 54 is slidably disposed within the tool body 24 and has a downwardly extending bore 56 for slidably receiving the coupling member 46. A force imposing spring member 58 is disposed within tool body 24 and acts between the piston-like member 54 and the cover 60 of the tool body. It can be seen that the line of force extends from the air cylinder 16 to the tool body 24 and then through the spring member 58 to the tool head 40.

Secured to the tool body 24 is a bracket member 62 which carries a microswitch 64. A hand lever 66 is secured to the tool head 40 and carries a switch actuating member 68. The switch 64 has electrical leads 70 operatively connected thereto and extending into a suitable electrical control unit 72 schematically shown in FIG- URE 7. The control unit 72 is energized by a switch 74 which may be hand or foot operated. A solenoid valve 76 is operatively connected to the air cylinder 16 and has electrical leads 78 connected thereto and also extending into the control unit 72. The control of valve 76 will become clear as the overall operation of the tool is described.

A work piece 80 is shown having a plurality of eyelets 82 mounted therein through which a wire conductor will extend which is to be terminated. A post or stake 84 is placed in each of the eyelets 82 with just sufficient force to maintain the stake in position. With the stake thus positioned the wire to be terminated will extend loosely between the stake and the eyelet.

Figure 4:
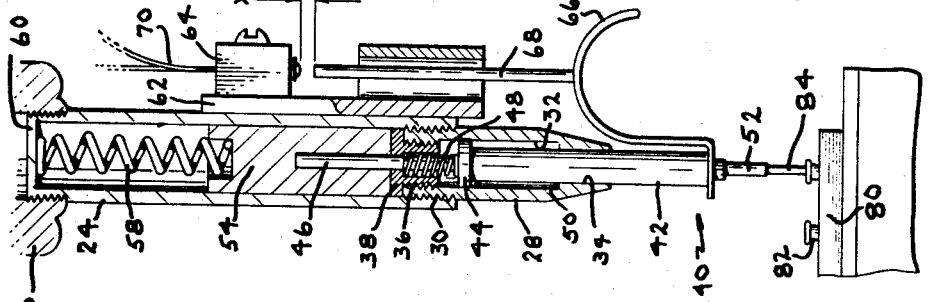
Figure 3:
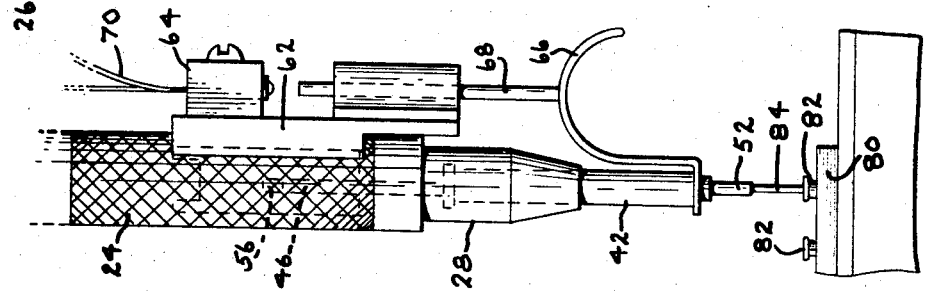
Figure 2:
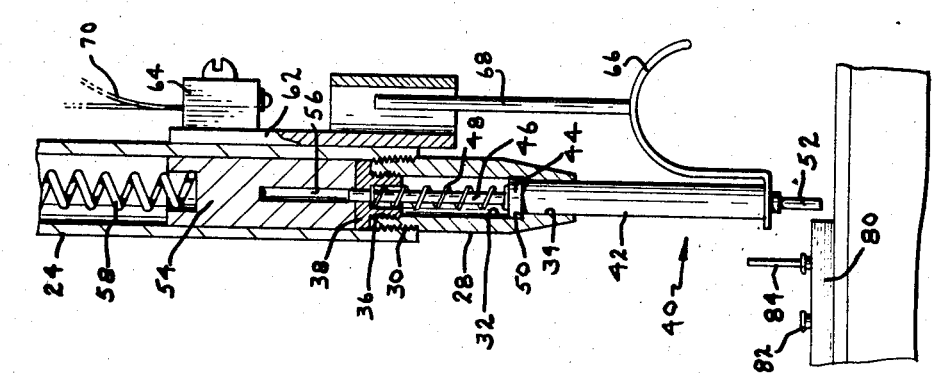

When it is desired to effect a termination the work piece 80 is placed on the base 10 with one of the stakes 84 adjacent to the staking head 52. This is the position shown in FIGURE 2. For ease of explanation we may assume that it has been determined that a force of twelve pounds must be exerted on the stake 84 in order to properly seat it within the eyelet 82 to achieve an effective electrical termination. To initially set the tool the lever 66 is grasped by the hand of the operator and moved upwardly thus raising the tool head 40 against the bias of spring 48. With the tool head thus raised the work piece 80 is moved until one of the stakes 84 is directly under the staking head 52. The lever 66 is then released to allow the head 52 to rest upon the top of stake 84. The spring 48 is normally a fairly light spring and in this instance is designed to deliver two pounds of force upon complete compression of the spring. The tool head 40 will be at a distance from the base 10 dependent upon the length of the stake 84. Since the length of the stake may vary there will be some unknown amount of force being exerted by the spring 48, this force ranging between zero and two pounds. FIGURE 3 shows the tool in its preset position with the head 40 resting on the stake 84. With the tool thus positioned the operator will close the switch 74 which will operate, through the control unit 72, to move the solenoid valve 76 to its driving position whereby air will flow through the air hose 18 into the air cylinder 16 to begin downward movement of the tool body 24. The speed of descent of tool body 24 will be dependent upon the setting of the flow control valve 20. The spring 58 is a relatively stiff spring so initial descent of the tool body will cause the spring 58 to act as a rigid member thereby causing the further compression of the spring 48. The weaker spring 48 will continue to collapse until the coupling member 46 contacts the bottom of the bore 56 in the piston-like member 54. This position is shown in FIGURE 4. It can be seen in FIGURE 4 that when bottoming occurs between the coupling member and the piston-like member there will be a distance X separating the microswitch 64 from the switch actuator 68. This distance X will remain the same regardless of the position of the tool head 40 relative to the base 10. The spring 58 in this example is designed to deliver ten pounds force upon being displaced a distance equal to X.

Up to this point the piston 54 and tool body 24 have moved as a unit. However, since bottoming has now occurred between member 46 and piston 54 this unitary movement can no longer take place. Therefore continued descent of the tool body 24 causes relative motion between the tool body and the piston 54 thus causing compression of spring 58. Since the spring 58 is compressing there is a gradually increasing force being delivered to the tool head through the spring and also the spring 48 is continuing to compress thereby increasing its force output to its maximum of two pounds. When the spring 58 has been compressed an amount equal to X the desired output force from the spring has been attained and, as seen in FIGURE 5, this position causes the actuating member 68 to contact the microswitch 64. The position shown in FIGURE 5 represents the extreme downward position of the tool wherein a force of twelve pounds is being delivered. Actuation of the microswitch 64 causes reversal of the solenoid valve 76 thus directing the air from the hose 18 through a bypass at the top of the valve thus cutting off the power delivered to the air cylinder 16. Since the air pressure has been removed the tool body 24 will return to its initial position under the force of the springs 48 and 58. This position is shown in FIGURE 6 wherein the lever 66 will again be raised to allow the work piece to be removed from the tool with a completed electrical termination. It can be seen that the use of springs for delivering the force to the tool head performs a dual function of permitting accurate control of the force output of the tool and also permitting a shock absorbing action upon initiation of the air cylinder 16. Since the springs exert a gradually increasing force there is no sudden force applied to the stake which might cause damage to the stake or the wire conductor.

The particular spring forces set forth herein are by way of illustration only, it being obvious that any combination of springs may be used in order to effect the desired result. The spring 48 should normally be a fairly light spring however in order that the operator may easily raise the tool head to effect the initial setting of the tool.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. A staking tool comprising a base, support means secured to said base, drive means mounted on said support means, a tool body operatively connected to said drive means for movement toward and away from said base, a tool head carried by said tool body for movement therewith and reciprocal movement relative thereto, a piston-like member slidably received within said tool body, first resilient means disposed between said tool head and said tool body for biasing said head away from said body and toward said base to permit initial setting of said head relative to said base, means for coupling said tool head to said piston-like member, second resilient means interposed between said tool body and said piston-like member for transmitting to said piston-like member the force applied to said tool body by said drive means, and sensing means responsive to a predetermined force exerted by said second resilient means for rendering inactive said drive means.

2. A staking tool as defined in claim 1 wherein said sensing means comprises switch means secured to said tool body and switch actuating means secured to said tool head.

3. Staking apparatus comprising a base for receiving a workpiece, a staking tool for operating on said workpiece, support means for supporting said tool above said base, and drive means connected to said tool for moving said tool toward and away from said base, said tool comprising a tool body capable of reciprocating movement toward and away from said base, a tool head carried by said tool body for movement therewith and reciprocal movement relative thereto, a piston-like member slidably received within said tool body, first resilient means disposed between said tool head and said tool body for biasing said head away from said body and toward said base to permit initial setting of said head relative to said base, means for coupling said tool head to said piston-like member, second resilient means interposed between said tool body and said piston-like member for transmitting to said piston-like member the force applied to said tool body by said drive means, and sensing means responsive to a predetermined force exerted by said second resilient means for rendering inactive said drive means.

4. Staking apparatus as set forth in claim 3 further comprising means secured to said tool head and capable of being grasped by an operator to effect said initial setting of said tool head.

5. Staking apparatus as set forth in claim 4 wherein said sensing means comprises switch means, said switch means being actuated by movement of said tool head relative to said tool body.

References Cited

UNITED STATES PATENTS

| | | | |
|---|---|---|---|
| 2,820,283 | 1/1958 | Anderson et al. | 29—203 |
| 3,040,422 | 6/1962 | Lewis | 29—240 |
| 3,074,155 | 1/1963 | Cootes et al. | 29—206 |
| 3,279,044 | 10/1966 | Roper | 29—206 |

THOMAS H. EAGER, *Primary Examiner.*